(12) United States Patent
Rumpf

(10) Patent No.: US 7,733,643 B1
(45) Date of Patent: Jun. 8, 2010

(54) DIGITAL PLAYER INTERFACE DEVICE WITH EXCHANGEABLE ADAPTER

(75) Inventor: Horst Rumpf, Wetzlar (DE)

(73) Assignee: Philips & Lite-On Digital Solutions Corporation, Taipei (TW)

( * ) Notice: Subject to any disclaimer, the term of this patent is extended or adjusted under 35 U.S.C. 154(b) by 0 days.

(21) Appl. No.: 12/437,304

(22) Filed: May 7, 2009

(51) Int. Cl.
*G06F 1/16* (2006.01)

(52) U.S. Cl. ............... 361/679.43; 361/679.44; 361/679.58; 710/303; 710/304

(58) Field of Classification Search ............ 361/679.41, 361/679.43
See application file for complete search history.

(56) References Cited

U.S. PATENT DOCUMENTS

| | | | | |
|---|---|---|---|---|
| 5,310,358 | A * | 5/1994 | Johnson et al. ............ | 439/358 |
| 5,627,727 | A * | 5/1997 | Aguilera et al. ........ | 361/679.43 |
| 5,689,654 | A * | 11/1997 | Kikinis et al. ............... | 710/303 |
| 5,699,226 | A * | 12/1997 | Cavello ................. | 361/679.43 |
| 5,708,707 | A * | 1/1998 | Halttunen et al. ........... | 379/446 |
| 6,301,106 | B1 * | 10/2001 | Helot et al. ............ | 361/679.55 |
| 6,341,218 | B1 * | 1/2002 | Poplawsky et al. ....... | 455/569.1 |
| 6,961,237 | B2 * | 11/2005 | Dickie .................. | 361/679.04 |
| 7,535,706 | B2 * | 5/2009 | Herberholt et al. ..... | 361/679.41 |
| 7,564,678 | B2 * | 7/2009 | Langberg et al. ....... | 361/679.01 |
| 7,580,255 | B2 * | 8/2009 | Crooijmans et al. .... | 361/679.56 |
| 7,583,499 | B2 * | 9/2009 | Lin et al. ............... | 361/679.58 |
| 2002/0024794 | A1 * | 2/2002 | Lin et al. .................... | 361/686 |
| 2002/0054476 | A1 * | 5/2002 | Han et al. ................... | 361/686 |
| 2006/0250764 | A1 * | 11/2006 | Howarth et al. ............. | 361/683 |
| 2007/0133165 | A1 * | 6/2007 | Liao et al. ................... | 361/685 |
| 2008/0137285 | A1 * | 6/2008 | Chuang ..................... | 361/686 |
| 2008/0259550 | A1 * | 10/2008 | Lien .......................... | 361/683 |
| 2008/0266783 | A1 * | 10/2008 | Mills et al. ................. | 361/686 |
| 2009/0097192 | A1 * | 4/2009 | Riddiford ............. | 361/679.01 |
| 2009/0153002 | A1 * | 6/2009 | Kinoshita et al. ........ | 312/223.1 |

\* cited by examiner

*Primary Examiner*—Jayprakash N Gandhi
*Assistant Examiner*—Anthony Q Edwards
(74) *Attorney, Agent, or Firm*—Muncy, Geissler, Olds, & Lowe, PLLC

(57) ABSTRACT

A digital player interface device with exchangeable adapter is provided to comprise an adapter providing with a through hole for load-on/off of a digital player and a first and a second engaging parts on its both end; an adapter-fixing element having a guiding rib and a concavity with a fixing spring; and a chassis having a guiding groove, a restriction groove and a adapter snapper. When the adapter is sliding on the chassis, the adapter pushes the adapter-fixing element moving along the guiding groove, and the fixing spring is released from the restriction groove to engage the first engaging part of the adapter. When the adapter is removed from the chassis, the adapter-fixing element moves back to a home position.

8 Claims, 11 Drawing Sheets

DIGITAL PLAYER INTERFACE DEVICE WITH EXCHANGEABLE ADAPTER

BACKGROUND OF INVENTION

1. Field of the Invention

The present invention relates generally to a digital player interface device with exchangeable adapter, and more particularly to a digital player interface device with exchangeable adapter suitable for various size digital player.

2. Description of Related Art

With the development of growing mature digital video technology, a variety of digital video formats have been developed, such as: MP3 (ISO-MPEG Audio Player-3), MP4 (MPEG-4), RMVB (Real Media Variable Bitrate), which features compactness and exhibits excellent images/voice quality; so digital players are specifically developed along with the widespread permanent flash memory.

Unlike a traditional digital player, the aforementioned digital player mainly uses the flash memory or micro HD as the storage medium other than cassette or CD; thus digital player has been designed and developed with thin-profile and innovative design, among the digital player, iPod player developed by APPLE, is a representative and most popular product in this field.

Each year a new iPod-generation from APPLE comes to the market and these devices get more and more popular. These digital players with music playing and recording function allow people to watch TV and video channels by connecting to computer, amplifier, television and car audio-infotainment-system through a connection interface.

Despite of the functional modification of the aforementioned digital players, there is a big room for improving the interfacing between the digital player and computer, e.g. the digital player is generally interfaced with the computer via an exposed socket, namely, the digital player lacks of a safe storage space, leading possibly to the interference by surroundings or even damage of the thin-profile player; in addition, the terminal adaptor for the player is susceptible to dust against the interfacing performance and appearance.

Thus, to provide a safe and dust-free storage space, it would be advanced if the art could develop an improved structure which is suitable for various kinds of digital player having different size and is capable of data exchanging with the computer and also electric charging.

Accordingly, the present inventor has investigated on the digital player and interface on electronic devices such as computers and thus completed the present invention.

SUMMARY OF THE INVENTION

The main objective of the present invention is to provide a digital player interface device with exchangeable adapter, which comprising:

an adapter, which is provided with a through hole for load-on/off of a digital player, on its both end a first and a second engaging parts are provided, respectively;

an adapter-fixing element, which comprises a guiding rib and a concavity on its lower surface; wherein a fixing spring is provided in the concavity; and a chassis, on its top surface a guiding groove, a restriction groove and a adapter snapper are provided, wherein the guiding rib of adapter-fixing element is slid in the guiding groove, the restriction groove is used for accommodating the fixing spring when the adapter-fixing element is at a home position, and the adapter snapper is used for snapping the second engaging part of the adapter when the adapter is placed on the chassis;

wherein, when the adapter is sliding on the chassis, the adapter pushes the adapter-fixing element moving along the guiding groove, and the fixing spring is released from the restriction groove to engage the first engaging part of the adapter, wherein, when the adapter is removed from the chassis, the adapter-fixing element moves back to the home position.

According to the digital player interface device with exchangeable adapter in the present invention, the snapper is elastic and thus it can be down-pressed via a small pin such as paper clip to release the engagement with the second engaging part of the adapter if the adapter is intended to be removed from the device.

According to the digital player interface device with exchangeable adapter in the present invention, the adapter can be designed to various specification suited for various digital players as long as the adapter has the same profile in x- and z-directions. However, the size of the through hole in the adapter can be varied to suit various digital players. By association of the adapter-fixing element with the guiding groove, the restriction groove and the adapter snapper of the chassis, any kind of the adapter can be selected depending on the size of the digital players to be inserted.

According to the digital player interface device with exchangeable adapter in the present invention, the adapter-fixing element further comprises a connector carrier which can move in y-direction of the device; and a locking mechanism;

wherein, a terminal is provided on the connector carrier to be the interface of the digital player with computer, amplifier, television and audio-infotainment-system etc., at least an elastic member is provided between the connector carrier the and the back wall of the adapter-fixing element, so as to press against the connector carrier, and after the digital player contacts the terminal, enable the terminal to slide flexibly within the adapter-fixing element in y-direction, thus keeping the player and terminal in contact.

In the present invention, the locking mechanism can use any push-push locking mechanism well known in the field and is not limited. For example, the locking mechanism can be the following configuration, i.e. the locking mechanism comprises a guiding bulge provided below the connector carrier; a rotatable Y-shape rail, which is used to guide the swinging direction of the locking mechanism when the guiding bulge below the connector carrier shifts along the feature of the Y-shape rail; an elastic arm, which has a free end pressing against the inner wall of the adapter-fixing element so as to adjust flexibly the position and angle of the Y-shape rail with forward and backward swinging of the locking mechanism.

According to the digital player interface device with exchangeable adapter of the present invention, when the digital player is to be loaded on the adapter, the digital player could abut against the terminal and push the connector carrier moving in y-direction to guide the locking mechanism via the guiding bulge to shift forwardly until the digital player in position; when the digital player is to be ejected from the adapter, the digital player is pressed again to abut against the terminal and guide the locking mechanism via the guiding bulge again to shift backwardly and load-off the digital player from the adapter.

Therefore, the digital player interface device with exchangeable adapter of the present invention is suitable for various digital player having different size, can provide a safe and dust-free space for the digital player, and allow the digital player to be safely and reliably linked with computer, amplifier, television and audio-infotainment-system etc.

According to the digital player interface device with exchangeable adapter of the present invention, the elastic member is a compression spring; the connector carrier can slide flexibly within the adapter-fixing element based on the elastic member arranged between the connector carrier and corresponding inner wall of the adapter-fixing element.

According to the digital player interface device with exchangeable adapter of the present invention, the locking mechanism is hinged in adapter-fixing element; through the locking mechanism hinged in the adapter-fixing element and the guiding bulge provided below the connector carrier, the locking mechanism can swing forwards flexibly when the connector carrier moves in y-direction under the pressing force of the digital player; or the locking mechanism can swing backwards when the connector carrier is pressed again by the digital player, meanwhile the digital player can be loaded off from the adapter by releasing the restriction from the locking mechanism.

According to the digital player interface device with exchangeable adapter of the present invention, the Y-shape rail of the locking mechanism is interlocked with the guiding bulge, so the locking mechanism is guided to swing forwards or backwards at an angle; moreover, V concave on the Y-shape rail is used to limit the guiding bulge when it falls into the concave, and then locate the connector carrier and the digital player. Furthermore, if the digital player is pressed again so that the connector carrier is also pushed, the guiding bulge will be guided to be pulled out from V concave and released from its restriction, while the locking mechanism can shift backwards via the elastic force of elastic arm on the locking mechanism, and the connector carrier is pushed to an unlimited position so that the digital player is loaded off from the adapter.

According to the digital player interface device with exchangeable adapter of the present invention, the elastic arm of the locking mechanism is an elastic arm made of elastic materials or a torsional elastic member as long as it can provide the necessary elastic force; the free end of the elastic arm is against on the inner wall of the adapter-fixing element to provide an elastic force for resetting of the locking mechanism.

According to the digital player interface device with exchangeable adapter of the present invention, the aforementioned adapter is used to provide the digital player with a matching space; the dimension of the adapter of the digital player interface device can be properly determined depending on the size of the digital player to be inserted; and the adapter-fixing element can slide on the chassis to adjust its position depending on the adapter size to be placed; thereby the adapter can be replaced with a different one for matching a smaller or bigger digital player, and the position of the adapter-fixing element can also be adjusted to suit the adapter having different dimension.

According to the digital player interface device with exchangeable adapter of the present invention, it can be installed into various electronic apparatus such as computer, TV, car audio-infotainment-system and home audio and video application for digital player information exchange and electric charging, etc.

BRIEF DESCRIPTION OF THE DRAWINGS

The present invention is illustrated more detail by reference to the accompanying drawings, wherein.

DETAILED DESCRIPTION OF THE INVENTION

Figure 1:
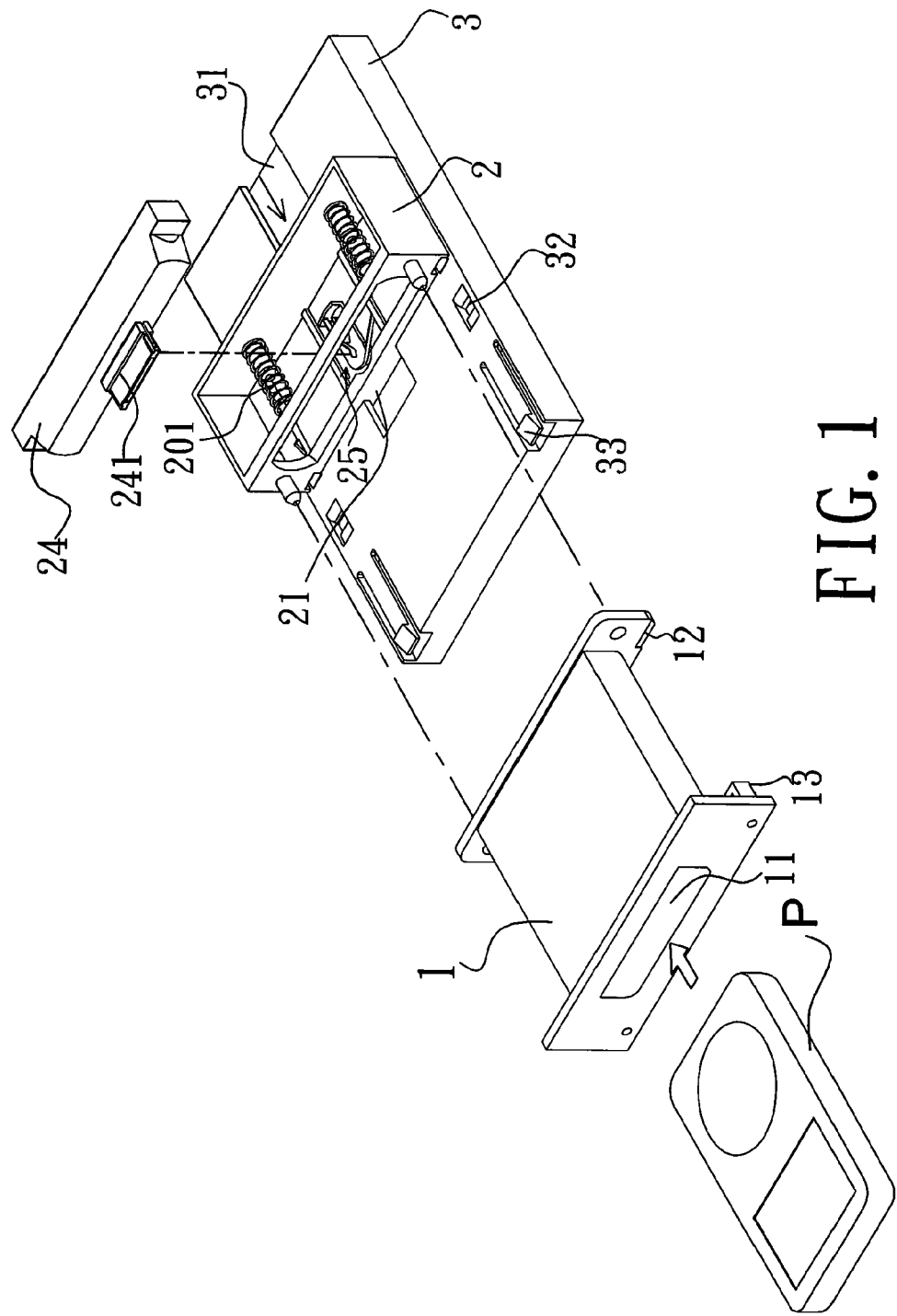
FIG. 1 shows an exploded perspective view of the digital player interface device with exchangeable adapter of the present invention.

The present invention is illustrated in more detail by reference the following preferred embodiments which are only used for illustration without limiting the scope of the present invention.

In the present invention, the term "home position" means the position that the adapter-fixing element is in its original position where no adapter is inserted.

In the present invention, the y-direction is defined as the direction of the digital player inserting into the device, and x-direction is defined as the direction along the width of the digital player, and z-direction is defined as the direction along the thickness of the digital player.

In the description of the present invention, the terms "front" and "back" indicate the direction shown in the drawings, while the terms "swing forward" indicates rightward rotation in the drawing, and "swing backward" indicates leftward rotation in the drawing.

Figure 2:
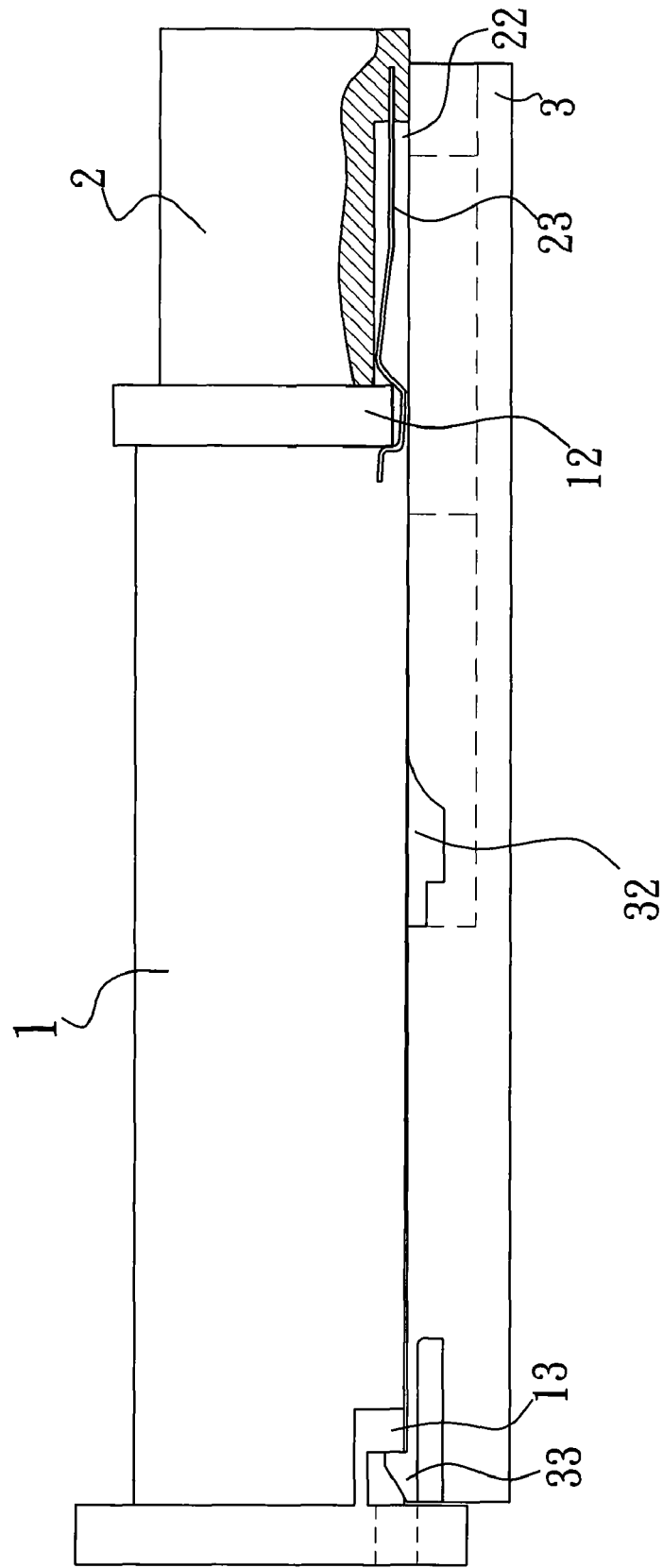
FIG. 2 shows a cross-sectional view of the of the digital player interface device with exchangeable adapter of the present invention in which the adapter is inserted and held by the adapter-fixing element.
Figure 3:
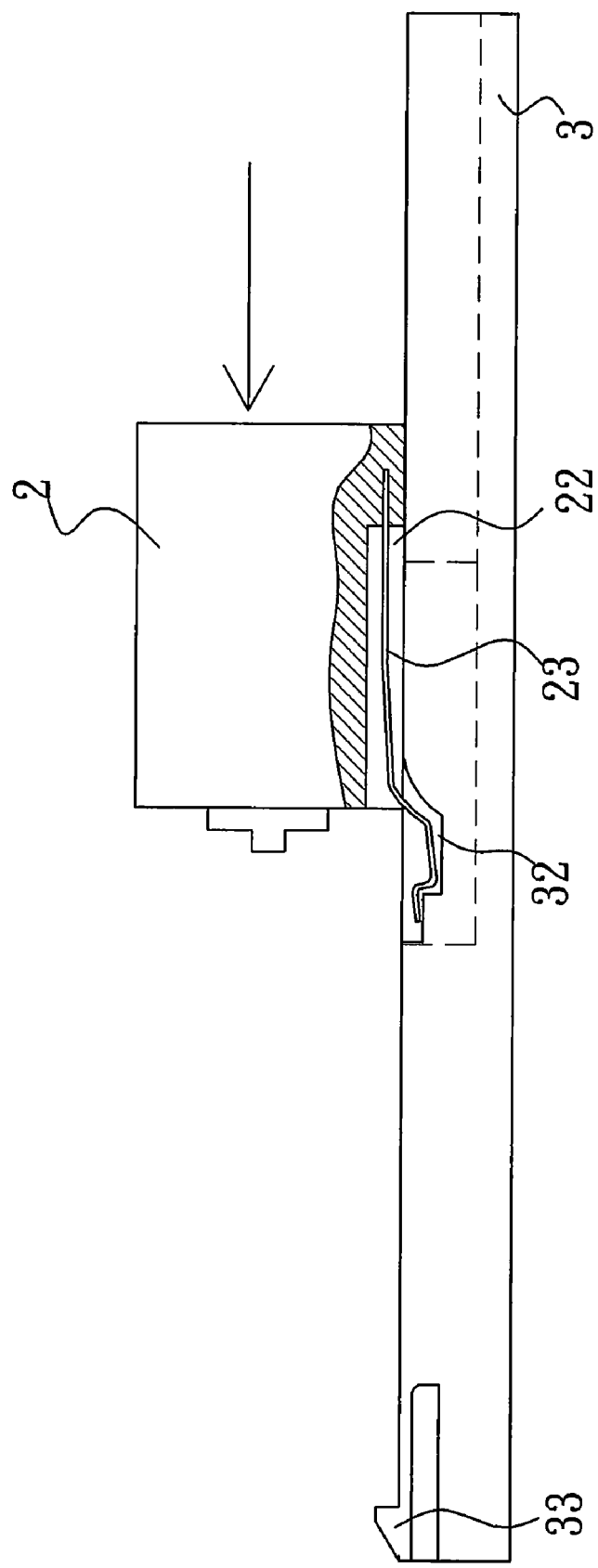
FIG. 3 shows a cross-sectional view of the digital player interface device with exchangeable adapter of the present invention in which no adapter is inserted and the adapter-fixing element is at home position.
Figure 4:
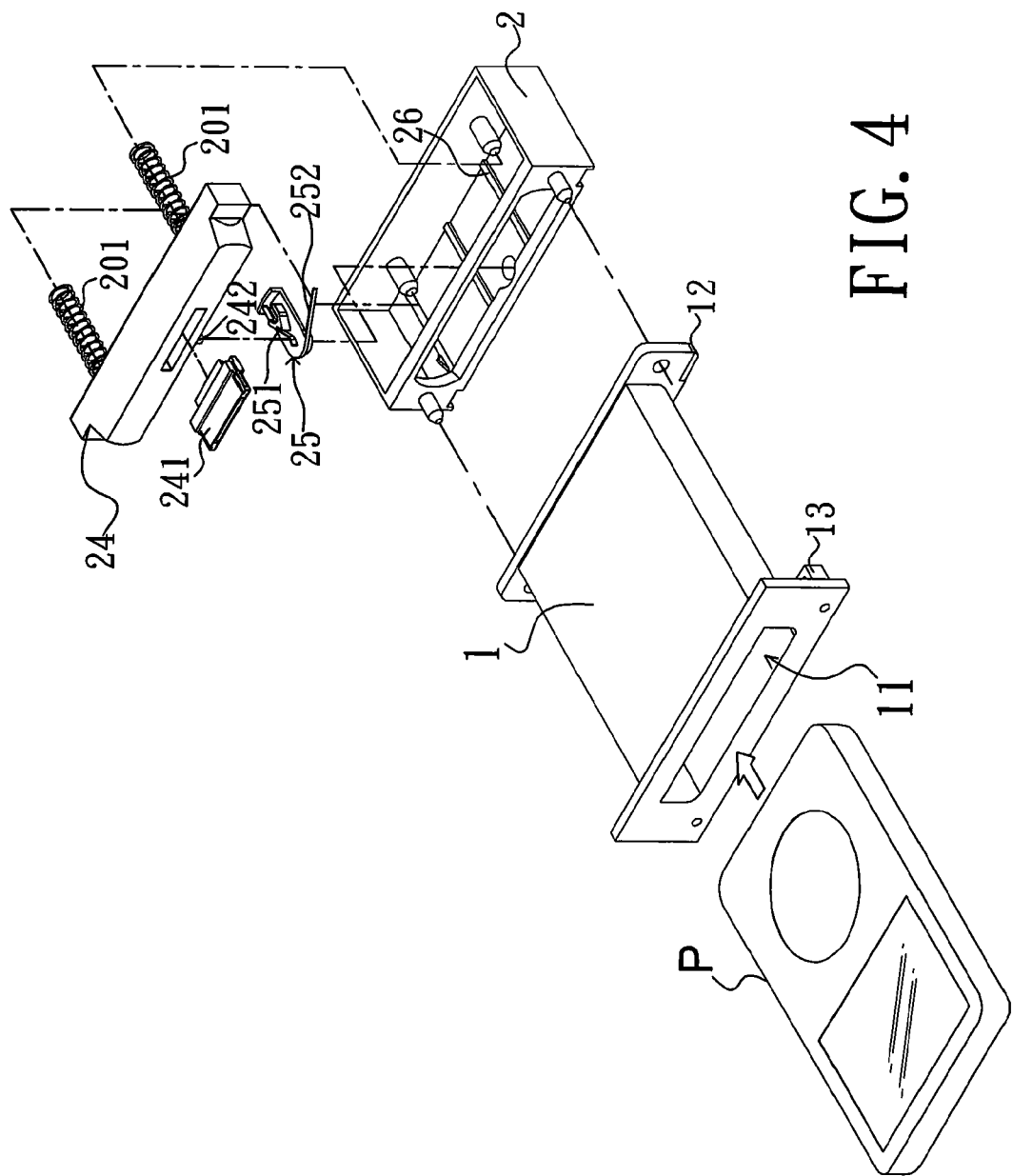
FIG. 4 shows an exploded perspective view of the adapter-fixing element in the digital player interface device of the present invention.

FIG. 1 depicts an exploded perspective view of the digital player interface device with exchangeable adapter of the present invention; FIG. 2 depicts a cross-sectional view of the of the digital player interface device with exchangeable adapter of the present invention in which the adapter is inserted and held by the adapter-fixing element; FIG. 3 shows a cross-sectional view of the digital player interface device with exchangeable adapter of the present invention in which no adapter is inserted and the adapter-fixing element is at home position; and FIG. 4 shows an exploded perspective view of the adapter-fixing element in the digital player interface device of the present invention.

As shown in the drawings, the digital player interface device of the present invention includes a adapter 1, which is provided with a through hole 11 for axial load-on/off of the digital player P, on its both end a first engaging part 12 and a second engaging part 13 are provided, respectively; a adapter-fixing element 2, which comprises a guiding rib 21 and a concavity 22 on its lower surface, wherein a fixing spring 23 is provided in the concavity 22 (as shown in FIGS. 2 and 3) for engaging the first engaging element 12; and a chassis 3, on its top surface a guiding groove 31 for the guiding rib 21 of adapter-fixing element 2 sliding there, a restriction groove 32 for accommodating and restricting the fixing spring 23; and a adapter snapper 33 for snapping the second engaging part 13 of the adapter 1 are provided.

Figure 5:
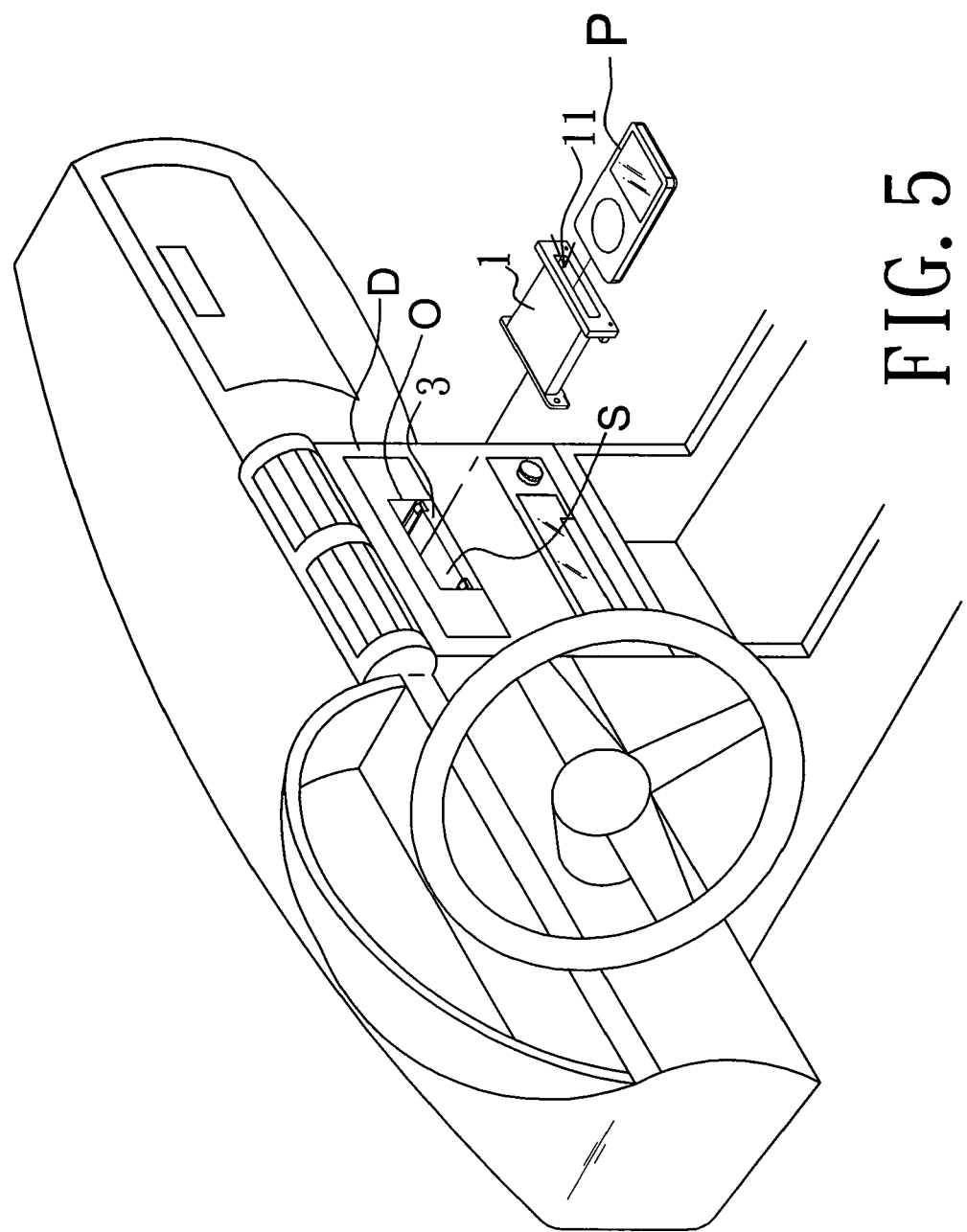
FIG. 5 shows an embodiment of the present invention of installing the digital player interface device in a front desk of an automobile.

The chassis can be installed in a space with an opening of other apparatuses for receiving the adapter. Refer to FIG. 5, FIG. 5 shows an embodiment of the present invention of installing the digital player interface device in a front desk of an automobile. The chassis 3 can be installed in a space S formed inside the front desk D of the automobile, and an opening O is formed on the front desk D connecting to the space S. Moreover, the adapter 1 is loaded on the chassis 3 from the opening O.

When the adapter 1 is slid and loaded on the chassis 3, the adapter 1 touches and pushes the adapter-fixing element 2 moving along the guiding groove 31, meanwhile, the fixing spring 23 will be released from restricting of the restriction groove 32 on the chassis 3 to engage the first engaging part 12 of the adapter 1 and move together with the adapter-fixing element 2. When the adapter-fixing element 2 is pushed to the end of the chassis 3, the snapper 33 engages with the second engaging part 13 so that the adapter 1 is fixed on the chassis 3 as shown in FIG. 2.

When the adapter 1 is removed from the device, the snapper 33 is down-pressed via a small pin such as paper clip to release the engagement with the second engaging part 13 of the adapter 1 for pulling out the adapter 1. As the fixing spring 23 holds the adapter 1, the adapter-fixing element 2 is moved together with the adapter 1 until the fixing spring 23 returns to the restriction groove 32 and releases the adapter 1. At that time, the adapter-fixing element 2 moves back to the home position.

Figure 6:
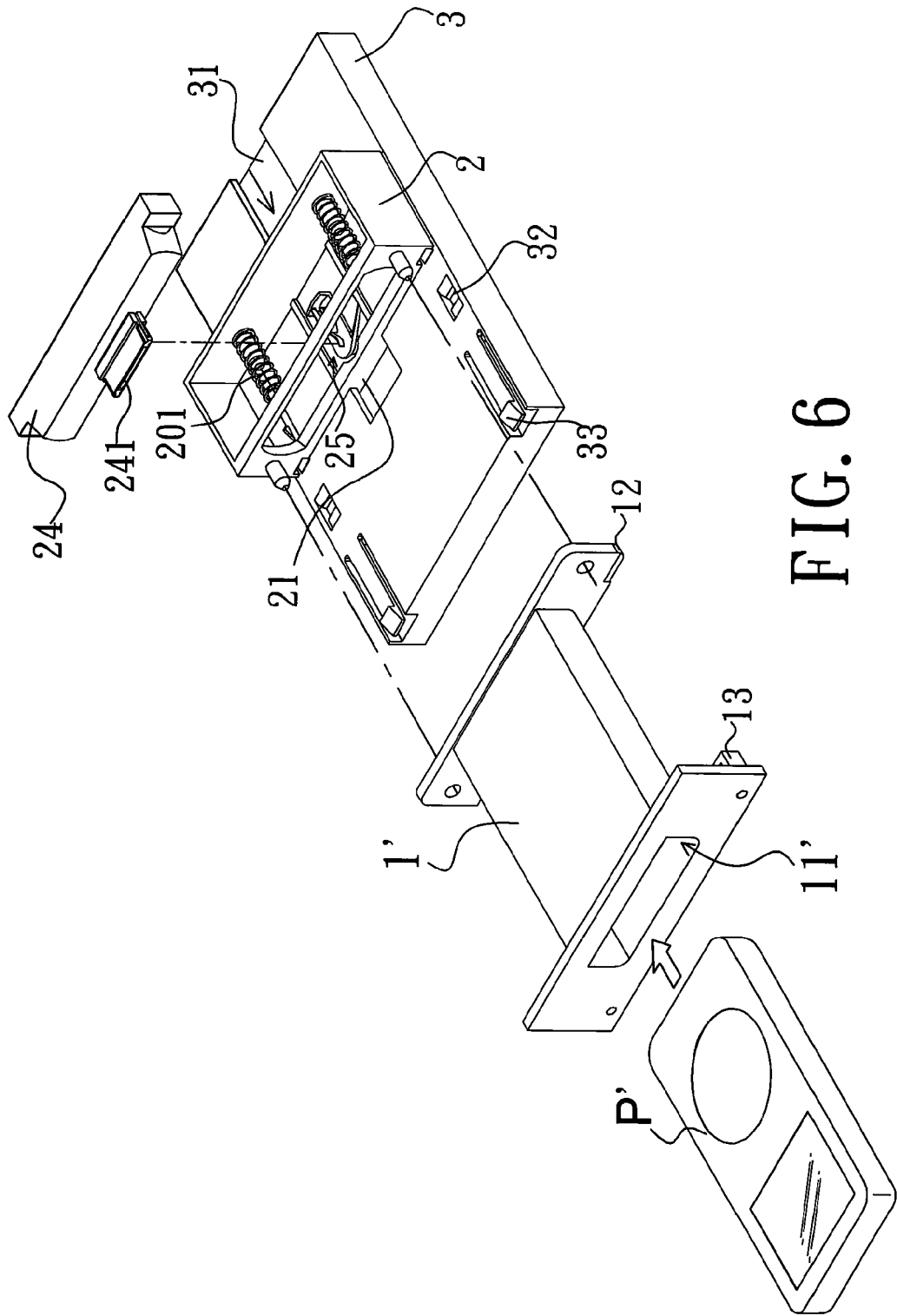
FIG. 6 shows another embodiment of the present invention of the digital player interface device wherein the adapter has a through hole with different size.

In the embodiment of the present application, another adapter is disclosed to have the same structure of the adapter 1, except for the size of the through hole. Refer to FIG. 6, FIG. 6 shows another embodiment of the present invention of the digital player interface device wherein the adapter 1' has a through hole 11' with different size. The through hole 11' of the another adapter 1' has a different size for placing the digital player P' with different size. As the structures of the adapter 1 and the another adapter 1', except the through hole 11 and 11', are the same for matting with the chassis 3, user can exchange the adapters 1, 1' for placing the digital players P, P' with different sizes. In the FIG. 6, the through hole 11' of the adapter 1' has a size smaller than that of the adapter 1 shown in FIG. 4 for placing a smaller digital player P'.

In the embodiment of the present application, the adapter-fixing element 2 further comprises a connector carrier 24 which can move in y-direction of the device; and a locking mechanism 25; in which a terminal 241 is provided on the connector carrier 24 at the side communicated with the adapter 1; and at least an elastic member 201 is provided between the connector carrier 24 and the corresponding inner wall of the adapter-fixing element 2, so as to provide an elastic force on the connector carrier 24 toward the adapter 1. When placing the digital player P into the through hole 11, the digital player P contacts the terminal 241, and the elastic member 201 enable the terminal 241 to slide flexibly within the adapter-fixing element 2, thus keeping the digital player P and terminal 241 in contact. Thus, when the digital player P is loaded to the through hole 11 of the adapter 1 and gets in contact with the terminal 241, the connector carrier 24 will be pushed by the digital player P to move in y-direction of the device, so the continuous contact between the terminal of digital player P and terminal 241 can be kept by the compressive force provided by the elastic member 201; conversely, when the digital player P is loaded off from the adapter 1, the connector carrier 24 will push the digital player P out of the adapter 1 via the resilience force provided by the elastic member 201.

In the present invention, the locking mechanism can use any push-push locking mechanism well known in the field and is not limited. For example, it can use the one having the following configuration, i.e. the locking mechanism 25 comprises a guiding bulge 242 provided below the connector carrier 24; a rotatable Y-shape rail 251, which is used to guide the swinging direction of the locking mechanism 25 when the guiding bulge 242 shifts along the Y-shape rail 251; an elastic arm 252, which has a free end pressing against the inner rib 26 of the adapter-fixing element 2 so as to adjust flexibly the position and angle of the Y-shape rail 251 with forward and backward swinging of the locking mechanism 25.

Figure 7:
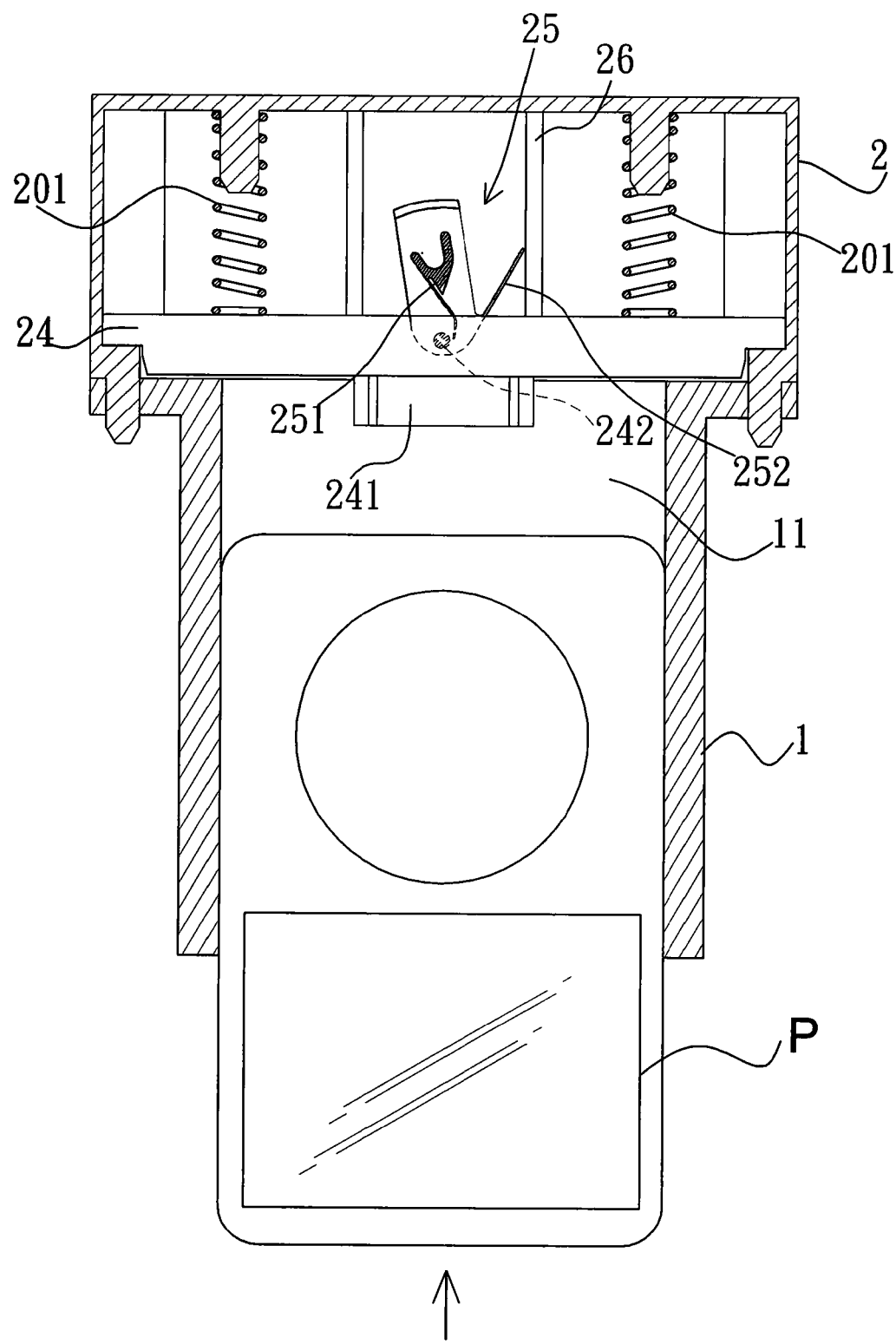
FIG. 7 shows a perspective view of the digital player interface device with exchangeable adapter of the present invention showing the status of locking mechanism when the digital player is being inserted into the through hole of the adapter.
Figure 8:
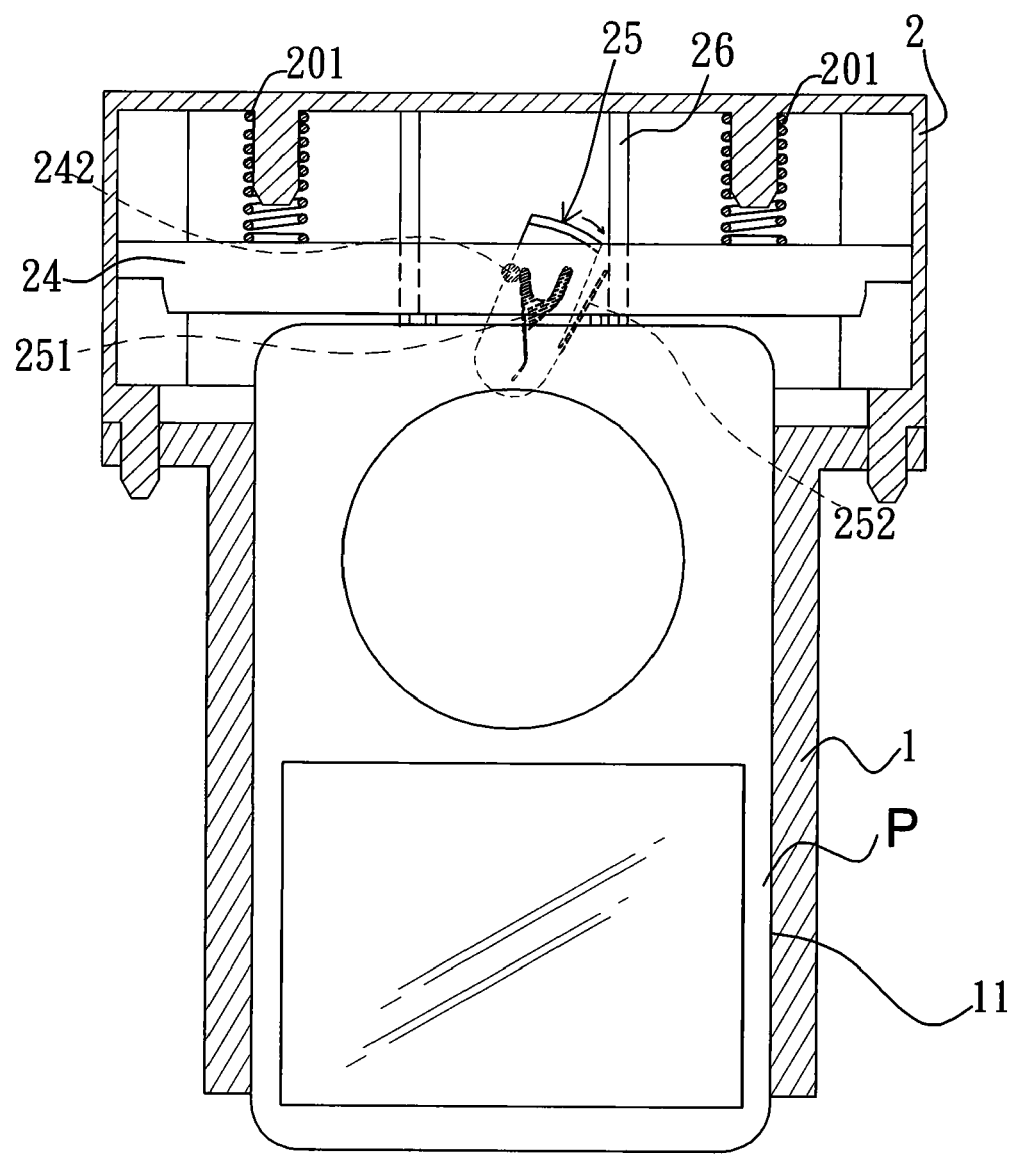
FIG. 8 shows a perspective view of the digital player interface device with exchangeable adapter of the present invention showing the status of locking mechanism when the digital player contacts the terminal of the connector carrier and pushes it into the adapter-fixing element along an axial direction (i.e. y-direction).
Figure 9:
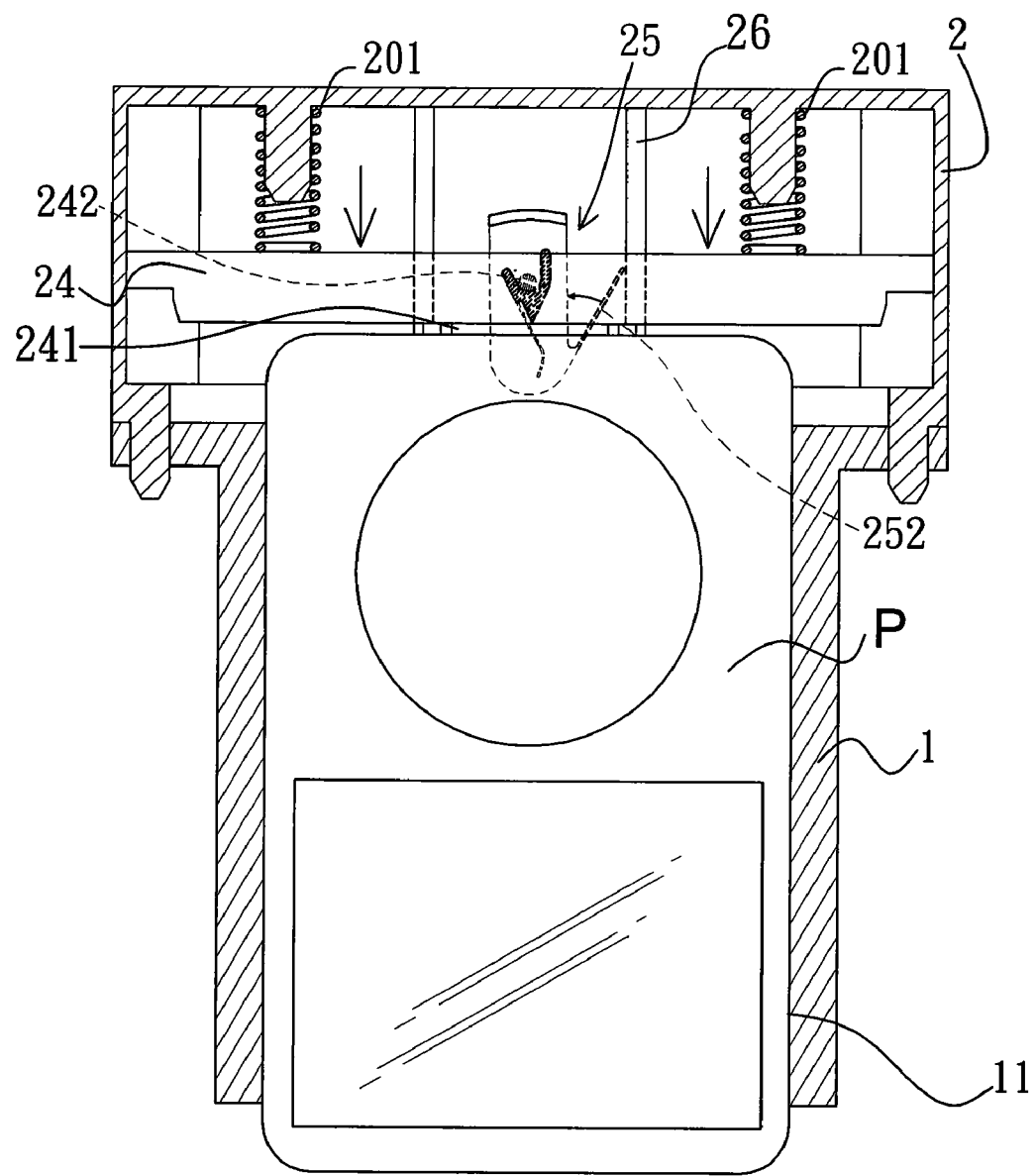
FIG. 9 shows a status view of the locking mechanism when the digital player has been already located in the adapter of the digital player interface device of the present invention.
Figure 10:
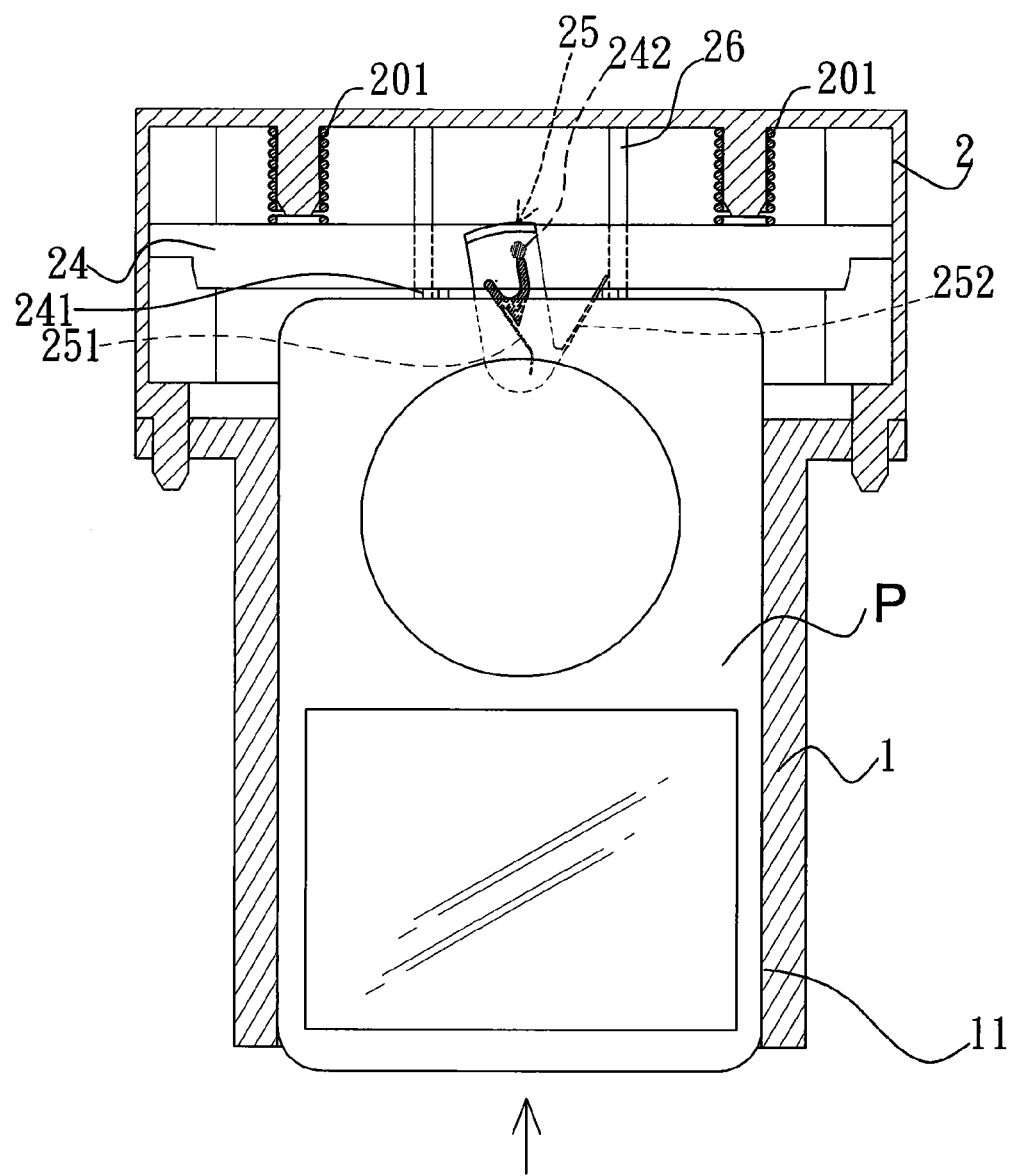
FIG. 10 shows a status view of the locking mechanism when the digital player is being loaded off from the digital player interface device of the present invention.
Figure 11:
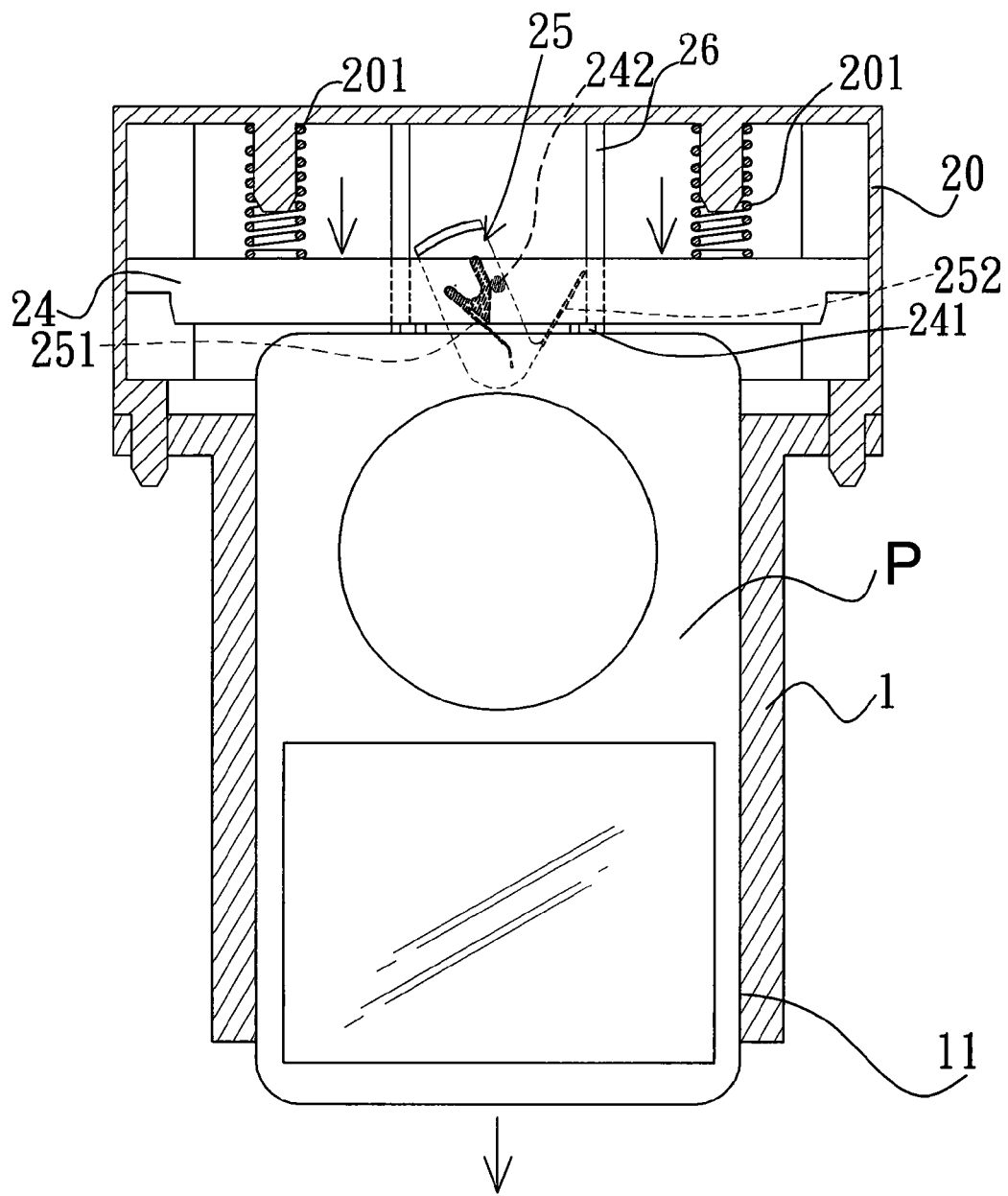
FIG. 11 shows a status view of the locking mechanism when the digital player has been loaded off from digital player interface device of the present invention.

Please referring to FIGS. 7 to 11 which are sequence views of the digital player interface device of the present invention while the digital player is inserted into the digital player interface device, in which FIG. 7 depicts the status of locking mechanism 25 when the digital player P is be inserting into the through hole 11 of the adapter 1; FIG. 8 depicts the status of locking mechanism 25 when the digital player P contacts the terminal 241 of the connector carrier 24 and pushes the connector carrier 24 into the adapter-fixing element 2 along an y-direction of the device; FIG. 9 depicts the status of locking mechanism 25 when the digital player P is located on the digital player interface device of the present invention; FIG. 10 depicts the status view of the locking mechanism 25 when the digital player P is to be loaded off from the digital player interface device of the present invention; FIG. 11 depicts the status view of the locking mechanism 25 when the digital player P has been loaded off from digital player interface device of the present invention.

Please refer to FIG. 7. When the digital player P is pushed into the through hole 11 of the adapter 1 of the digital player interface device but not yet gets contact with the connector carrier 24, the locking mechanism 25 is under an idle position, namely, the locking mechanism 25 is not interlocked with the guiding bulge 242. Next please refer to FIG. 8, when the digital player P is pushed continuously into the interface device of present invention, the digital player P will contact the terminal 241 of the connector carrier 24 and apply a force to it for inward moving, then the guiding bulge 242 contacts the Y-shape rail 251 of the locking mechanism 25 and shifts along its feature; meanwhile the Y-shape rail 251 is driven to rotate at an angle such that the locking mechanism 25 swing forwards. Please also refer to FIG. 9, when the guiding bulge 242 crosses over the left-hand top of the V-shaped portion of the Y-shape rail 251, a reaction force (counterforce) is applied due to the resilience force of the elastic member 201 provided in the adapter-fixing element 2 while the free end of the elastic arm 252 on the locking mechanism 25 is supported by a inner rib 26 within the adapter-fixing element 2; in such case, the guiding bulge 242 falls into the concave of the V-shaped portion, and the digital player P is positioned in the digital player interface device of the present invention, namely, the locking mechanism 25 and guiding bulge 242 are interlocked.

Please refer to FIG. 10, when the digital player P is to be loaded off from the interface device of the present invention, it is only required to push the digital player P inwards again, then the guiding bulge 242 is pushed to shift along the right-side of the V-shaped position of the Y-shape rail 251 and cross over the top to disengage from Y-shape rail 251, owing to the resilience force generated by the free end of the elastic arm 252 pressing against on the inner rib 26; at the same time, the connector carrier 24 is pushes outwards by the elastic member 201 to, therefore, move the digital player P protruding from the through hole 11, and thus reset the locking mechanism 25 and the connector carrier 24 as shown in FIG. 11.

In this preferred embodiment, the elastic arm 252 of the locking mechanism 25 is made of elastic materials to provide an elastic force (shown in FIG. 8), and one end of the elastic arm 252 is fixed on the adapter-fixing element 2, so that the locking mechanism 25 can flexibly swing via resilience force generated by the free end pressing against the inner rib 26 in the adapter-fixing element 2; however, the elastic arm 252 of the locking mechanism 25 is not limited to the form of elastic arm in the present invention, a torsional elastic member can be used instead of the elastic arm to provide elastic force.

According to the digital player interface device with exchangeable adapter of the present invention, it can be installed into a computer, TV, a car information system, home audio and video application or the like.

While the present invention has been particularly shown and described with reference to exemplary embodiments thereof, it will be understood by those of ordinary skill in the art that various changes and modifications may be made therein without departing from the spirit and scope of the present invention as defined by the following claims.

The invention claimed is:

1. A digital player interface device with an exchangeable adapter, which comprising:
   an adapter, which is provided with a through hole for load-on/off of a digital player, and a first and a second engaging part provided, respectively, at both ends of said adapter;
   an adapter-fixing element, which comprises a guiding rib and a concavity on its lower surface; wherein a fixing spring is provided in the concavity; and
   a chassis having a guiding groove, a restriction groove and an adapter snapper provided on its top surface, wherein the guiding rib of an adapter-fixing element is slid in the guiding groove, the restriction groove is used for accommodating the fixing spring when the adapter-fixing element is at a home position, and the adapter snapper is used for snapping the second engaging part of the adapter when the adapter is placed on the chassis;
   wherein, when the adapter is sliding on the chassis, the adapter pushes the adapter-fixing element along the guiding groove, and the fixing spring is released from the restriction groove to engage the first engaging part of the adapter,
   wherein, when the adapter is removed from the chassis, the adapter-fixing element moves back to the home position.

2. The digital player interface device with exchangeable adapter according to claim 1, wherein when the adapter pushes the adapter-fixing element to the end of the chassis, the adapter snapper engages with the second engaging part so that the adapter is fixed on the chassis.

3. The digital player interface device with exchangeable adapter according to claim 1 further comprising another adapter having the same structure of the adapter except for the size of the through hole.

4. The digital player interface device with exchangeable adapter according to claim 1, wherein the adapter-fixing element further comprises a connector carrier which moves in a y-direction of the device; and a locking mechanism; in which
   a terminal is provided on the connector carrier to be the interface of the digital player; at least an elastic member is provided between the connector carrier the and the back wall of the adapter-fixing element, so as to press against the connector carrier, and after the digital player contacts the terminal, the elastic member enables the terminal to slide flexibly within the adapter-fixing element in the y-direction, thus keeping the player and terminal in contact.

5. The digital player device with exchangeable adapter according to claim 4, wherein the elastic member provided between the connector carrier and the back wall of the adapter-fixing element is a compression spring.

6. The digital player device with exchangeable adapter according to claim 1, wherein the locking mechanism comprises a guiding bulge provided below the connector carrier; a rotatable Y-shape rail, which is used to guide a swinging direction of the locking mechanism when the guiding bulge below the connector carrier shifts along the feature of the Y-shape rail; an elastic arm, which has a free end pressing against the inner wall of the adapter-fixing element so as to adjust flexibly the position and angle of the Y-shape rail with forward and backward swinging of the locking mechanism.

7. The digital player device with exchangeable adapter according to claim 6, wherein the elastic arm is an arm extending from the locking mechanism and made of elastic materials.

8. The digital player device with exchangeable adapter according to claim 6, wherein the elastic arm is a wind spring.

* * * * *